US011923157B2

(12) United States Patent
Liu

(10) Patent No.: US 11,923,157 B2

(45) Date of Patent: Mar. 5, 2024

(54) MULTI-MODE MECHANICAL KEYBOARD SWITCH

(71) Applicant: Zeal Generation Inc., Richmond (CA)

(72) Inventor: Henry Liu, Vancouver (CA)

(73) Assignee: ZEAL GLOBAL HOLDINGS LTD., Richmond (CA)

(*) Notice: Subject to any disclaimer, the term of this patent is extended or adjusted under 35 U.S.C. 154(b) by 0 days.

(21) Appl. No.: 18/275,697

(22) PCT Filed: Feb. 9, 2022

(86) PCT No.: PCT/CA2022/050187

§ 371 (c)(1),
(2) Date: Aug. 3, 2023

(87) PCT Pub. No.: WO2022/170428

PCT Pub. Date: Aug. 18, 2022

(65) Prior Publication Data

US 2024/0038465 A1 Feb. 1, 2024

Related U.S. Application Data

(60) Provisional application No. 63/147,600, filed on Feb. 9, 2021.

(51) Int. Cl.

*H01H 13/85* (2006.01)
*H01H 13/78* (2006.01)

(52) U.S. Cl.

CPC ............ *H01H 13/85* (2013.01); *H01H 13/78* (2013.01); *H01H 2215/03* (2013.01); *H01H 2235/018* (2013.01)

(58) Field of Classification Search

CPC .... H01H 13/85; H01H 13/78; H01H 2215/03; H01H 2235/018

(Continued)

(56) References Cited

U.S. PATENT DOCUMENTS 5,004,880 A * 4/1991 Koutaka ................ H01H 13/14 200/521

10,431,402 B2 10/2019 Hsieh et al.

(Continued)

FOREIGN PATENT DOCUMENTS

| | | |
|---|---|---|
| CN | 105097342 A | 11/2015 |
| CN | 108010775 A | 5/2018 |
| CN | 108091514 A | 5/2018 |

OTHER PUBLICATIONS

ProWorld Cherry MX clone, retrieved from https://deskthority.net/wikii/ProWorld_Cherry_MX_clone, Aug. 22, 2020.

*Primary Examiner* — Omar Casillashernandez

(74) *Attorney, Agent, or Firm* — McCarthy Tétrault LLP

(57) ABSTRACT

A multi-mode mechanical key switch assembly has a housing and a stem supported in a base of the housing, the stem constrained to move, when depressed during keystroke, from a resting state and toward the base of the housing. The assembly has a removable contact leaf spring seated in the housing and having a contact portion located in a travel path of the stem for engaging with the stem during the keystroke to provide audible and/or tactile feedback. The contact leaf spring is movable between a first seated position and a second seated position to change the characteristics of the feedback. Removal of the contact leaf spring from the housing enables the stem to travel its maximum keystroke distance without auditory or tactile feedback.

18 Claims, 9 Drawing Sheets

(58) Field of Classification Search
USPC .......................................................... 340/407.2
See application file for complete search history.

(56) References Cited

U.S. PATENT DOCUMENTS

| | | | | |
|---|---|---|---|---|
| 10,572,018 | B2 | 2/2020 | Yang et al. | |
| 2003/0127468 | A1* | 7/2003 | Loghman-Adham ........................ | B65D 83/22<br>222/153.14 |
| 2018/0006648 | A1* | 1/2018 | Liu ........................ | H01H 13/85 |
| 2019/0393004 | A1 | 12/2019 | Wang et al. | |

* cited by examiner

MULTI-MODE MECHANICAL KEYBOARD SWITCH

RELATED APPLICATION

This application claims priority from U.S. Patent Application No. 63/147,600 filed on Feb. 9, 2021 entitled "MULTI-MODE MECHANICAL KEYBOARD SWITCH". For the purposes of the United States, this application claims the benefit under 35 U.S.C. § 119 of U.S. Patent Application No. 63/147,600 filed on Feb. 9, 2021 entitled "MULTI-MODE MECHANICAL KEYBOARD SWITCH". U.S. Patent Application No. 63/147,600 is incorporated herein by reference in its entirety for all purposes.

TECHNICAL FIELD

The present disclosure relates generally to mechanical keyboard switches.

BACKGROUND

Keyboards are generally characterized according to the type of switch that they incorporate. In mechanical-switch keyboards, also known as mechanical keyboards, each key contains a discrete mechanical switch. There are different kinds of mechanical switches, which provide different feedback such as tactile and/or audible feedback. In general, traditional mechanical keyboards are capable of providing only one of the following feedbacks at a time: (1) linear (no tactility, no sound, switch goes up and down without further resistance), (2) tactile (tactile feedback, no click sound), (3) clicky (tactile, with audible click at midway point), and (4) lock (switch remains locked when pressed downwards, and is only disengaged after another press). Different stem colours (one for each of the foregoing feedbacks) are sometimes used by keyboard switch manufacturers to differentiate between the mechanical switches.

Cherry's MX switches have been used in mechanical keyboards for a number of years. Cherry's MX switches use "gold crosspoint technology", where two electrically conductive contacts form a cross shape upon contact to allow the switch to actuate, registering a keystroke. Gold plating of the contacts improves durability and longevity of switches in humid environments. One of Cherry's (now expired) patents is U.S. Pat. No. 4,467,160 to Murmann et al., which is directed to a mechanical switch incorporating a plunger body that carries cams which control the flexing of contactors to make and break conductive connections with adjacent stationary contacts.

Some keyboard switch manufacturers have made switches that are similar to or compatible with Cherry's MX switches. Other keyboard switch manufacturers have made their own variants of a mechanical switch. For example, Alps switches are characterized by a rectangular shaped stem and a leaf spring. Alps' patents include U.S. Pat. No. 4,514,608 (directed to a lock type of switch) and No. 4186290 (directed to a push button switch with an inverted leaf spring).

ProWorld switches include an attempt to integrate a clicky leaf spring, based on Alps' switch design, with the Cherry MX switch stem form factor.

An exemplary mechanical keyboard switch assembly 100 is shown in FIG. 1. The switch assembly (also referred to more generally as a "switch") includes a stem 102 which supports a key cap (not shown) that is depressed by the user to actuate the key. The stem 102 is supported by a coil spring

104 which is biased upwardly (acting against the stem 102) to hold the key cap in its resting or initial position. When the user presses on the key cap with sufficient force to overcome the upward force provided by the coil spring 104, stem 102 is pushed down, causing a crosspoint contact 106 to make electrical contact with a Printed Circuit Board (PCB) thereby actuating a switch circuit. Once the user releases pressure on the key, the spring coil 104 moves the stem 102 back up to its initial position. The switch assembly 100 includes a housing 107 and a base 108 which support the stem 102 and coil 104. Base 108 attaches the switch assembly 100 to the PCB (not shown).

A mechanical keyboard switch is defined by its various characteristics, including: operation force; actuation point; reset point; total travel distance; and peak force (for tactile and clicky switches only). Operation force is the amount of force needed to press the key. Actuation point is the point at which the keystroke is registered. Reset point is the point on the upward return of the key at which the key is released (i.e. deactivated). Total travel distance is the distance the switch stem can travel downwards before it bottoms out, or is impeded from further travel (typically, due to it making contact with the housing 107). Peak force is only applicable for tactile and clicky switches, and is the point at which the peak force overcomes the tactile bump where feedback is felt by the user on the downwards press.

In the switch assembly 100 of FIG. 1, some resistance is felt during the keystroke as the spring coil 104 pushes up against the stem. For a tactile switch and clicky switch, another part of the keystroke feel is provided by a contact leaf spring 110, which is positioned within the housing 107 and base 108 to one side of the stem 102 and coil spring 104. The leaf spring 110 is shaped so as to provide a curved tip 112 having a bump that protrudes toward the base of the stem 102. The curved tip 112 engages with stem 102 as stem 102 is moved downward. This results in a distinct bump being felt as the user presses on the key cap to cause stem 102 to slide past the tip 112 on leaf spring 110.

In general, each of the existing switches discussed above provides only one of the feedbacks as noted above. To change to a different feedback for a key (for example, from tactile to clicky feedback), the switch's entire MX stem 102 needs to be replaced with a different MX stem having the desired feedback. In most cases, this is achieved by using a completely different variant of the switch 100. This can be time consuming and costly. As such, there is a need for a mechanical switch that can be operated to provide different types of feedback characteristics without requiring the replacement of the entire switch.

SUMMARY OF THE DISCLOSURE

In general, the present specification describes a mechanical keyboard switch having multiple modes of operation. Such modes may be characterized by their feedback and may include linear, tactile and clicky modes.

One aspect provides a multi-mode mechanical key switch assembly. The switch assembly includes a housing and a stem supported in a base of the housing, the stem constrained to move, when depressed during a keystroke, from a resting state and toward the base of the housing. The switch assembly also includes a removable contact leaf spring seated in the housing, the contact leaf spring having a contact portion located in a travel path of the stem for engaging with the stem during the keystroke to produce audible and/or tactile feedback. The contact leaf spring is movable between a first seated position and a second seated position. A distance between the contact portion and the stem at the resting state is decreased by moving the contact leaf spring from the first seated position to the second seated position in the housing, wherein the decreased distance is associated with decreased audible feedback.

In particular embodiments, the contact portion of the contact leaf spring includes one or more flexible prongs extending toward the stem and providing tactile feedback as the contact portion engages with the stem during the keystroke. An angle between the contact portion and the stem at the resting state is increased by moving the contact leaf spring from the first seated position to the second seated position in the housing, wherein the increased angle is associated with increased tactile feedback.

In particular embodiments, the housing includes a plurality of outer walls surrounding the stem, and a base supporting a ledge spaced apart from one of the outer walls, wherein in the first seated position the contact leaf spring is seated between the ledge and the one of the outer walls, proximally to the one of the outer walls, and is oriented substantially vertically, and wherein in the second seated position the contact leaf spring is seated between the ledge and the stem, proximally to the stem, and is oriented at an angle with respect to the stem so as to provide increased resistance to movement of the stem during an initial part of the keystroke.

Removal of the contact leaf spring from the housing enables the stem to travel its maximum keystroke distance without auditory or tactile feedback. Removal of the contact leaf spring thereby results in the switch assembly providing only linear feedback.

The switch assembly has a switch contact adjacent to the stem. In particular embodiments, the switch contact includes a conductive leaf spring having one or more legs extending toward the stem, wherein during the keystroke the one or more legs are pushed by the stem so as to make contact with a conductive element in the base, thereby closing a switch circuit.

A further aspect provides a mechanical keyboard switch assembly having a housing, and a stem supported in the housing and constrained to move, during a downward part of a keystroke, from a resting position and toward a base of the housing. The switch assembly has a contact leaf spring supported in the housing, wherein the contact leaf spring has a leaf contact portion arranged to be impinged by a stem contact portion of the stem during the downward part of the keystroke to provide tactile and/or audible feedback. The contact leaf spring is adjustable between a first orientation and a second orientation, wherein adjusting the contact leaf spring from the first orientation to the second orientation changes the tactile and/or audible feedback. According to certain embodiments, in the first orientation the leaf contact portion is a first distance from the stem contact portion when the stem is in the resting position, and in the second orientation the leaf contact portion is a second distance from the stem contact portion when the stem is in the resting position, wherein the first distance is greater than the second distance.

In some embodiments, the leaf contact portion is displaced by the stem contact portion during the downward part of the keystroke, wherein when the contact leaf spring is in the second orientation an increased level of force is required to be exerted on the stem to displace the leaf contact portion than when the contact leaf spring is in the first orientation. In particular embodiments, the leaf contact portion is oriented at a first angle with respect to the stem when the contact leaf spring is in the first orientation and the stem is in the resting position, and the leaf contact spring is oriented at a second angle with respect to the stem when the contact leaf spring is in the second orientation and the stem is in the resting position, wherein the second angle is greater than the first angle.

In some embodiments, the leaf contact portion has one or more flexible prongs located to be impinged by the stem contact portion during the downward part of the keystroke. In some embodiments, the contact leaf spring is removable from the housing. The switch assembly may have a pole extending from the base of the housing, wherein the stem has a cavity defined therein for receiving the pole.

According to certain embodiments, the housing has a plurality of walls extending from the base of the housing, wherein the base provides a ledge spaced apart from one of the outer walls. In the first orientation the contact leaf spring is seated between the ledge and the one of the outer walls, proximally to the one of the outer walls, and is oriented substantially vertically. In the second orientation the contact leaf spring is seated between the ledge and the stem, proximally to the stem, and is oriented at an angle with respect to the stem so as to provide increased resistance to movement of the stem during the downward part of the keystroke.

Another aspect provides a method for manufacturing a multi-mode mechanical key switch assembly. The method includes providing a housing, and providing a stem supported in a base of the housing, the stem constrained to move, when depressed during a keystroke, from a resting state and toward the base of the housing. The method further includes providing a removable contact leaf spring having a contact portion, wherein when the contact leaf spring is seated in the housing the contact portion is located in a travel path of the stem for engaging with the stem during the keystroke to provide audible and/or tactile feedback. The contact leaf spring is movable between a first seated position and a second seated position in the housing, wherein a distance between the contact portion and the stem at the resting state is decreased by moving the contact leaf spring from the first seated position to the second seated position in the housing, wherein the decreased distance is associated with decreased audible feedback.

The method includes providing the contact portion of the contact leaf spring with one or more flexible prongs extending toward the stem. The prongs provide tactile feedback as the contact portion engages with the stem during the keystroke. An angle between the contact portion and the stem at the resting state is increased by moving the contact leaf spring from the first seated position to the second seated position in the housing, wherein the increased angle is associated with increased tactile feedback.

The method includes providing, in the housing, a plurality of outer walls surrounding the stem, and a base supporting a ledge spaced apart from one of the outer walls. In the first seated position the contact leaf spring is seated between the ledge and the one of the outer walls, proximally to the one of the outer walls, and is oriented substantially vertically. In the second seated position the contact leaf spring is seated between the ledge and the stem, proximally to the stem, and is oriented at an angle with respect to the stem so as to provide increased resistance to movement of the stem during an initial part of the keystroke. Removal of the contact leaf spring from the housing enables the stem to travel its maximum keystroke distance without auditory or tactile feedback.

In particular embodiments, the method further includes positioning a switch contact adjacent to the stem, wherein the switch contact has a conductive leaf spring having one or more legs extending toward the stem, wherein during the keystroke the one or more legs are pushed by the stem so as to make contact with a conductive element in the base, thereby closing a switch circuit.

Additional aspects of the present invention will be apparent in view of the description which follows.

BRIEF DESCRIPTION OF THE DRAWINGS

Features and advantages of the embodiments of the present invention will become apparent from the following detailed description, taken with reference to the appended drawings in which.

DETAILED DESCRIPTION

The description which follows, and the embodiments described therein, are provided by way of illustration of examples of particular embodiments of the principles of the present invention. These examples are provided for the purposes of explanation, and not limitation, of those principles and of the invention.

This invention relates to a mechanical key switch package which offers multiple switch modes within the same package. In one embodiment, different switch feedbacks may be provided by changing the presence of or position of a leaf spring within the switch to provide clicky, tactile, or linear responses from the switch.

Keyboard enthusiasts often have personal preferences for a particular keyboard switch response and feedback. The preferences may change based on application (e.g. typing, gaming, etc.). The same keyboard can be provided to multiple people and invoke different opinions of the switch response. The difference in opinions makes it difficult for new keyboard enthusiasts to decide which type of switch feedback they prefer, without acquiring multiple types of switches and trying them out in person. However, by integrating three common switch feedbacks (clicky, tactile, linear) into one switch package through an adjustable and removable leaf spring, the mechanical switch assembly as described herein addresses the problem of providing a mechanical keyboard switch to a customer who does not know or is undecided as to which type of feedback they prefer. The user can trial different feedbacks by repositioning, adjusting or removing the leaf spring, and then customize their switch to provide the feedback of their choice. The user can change the switch mode at any time to achieve a more favourable response for a certain activity (such as typing, gaming, etc.).

Figure 1:
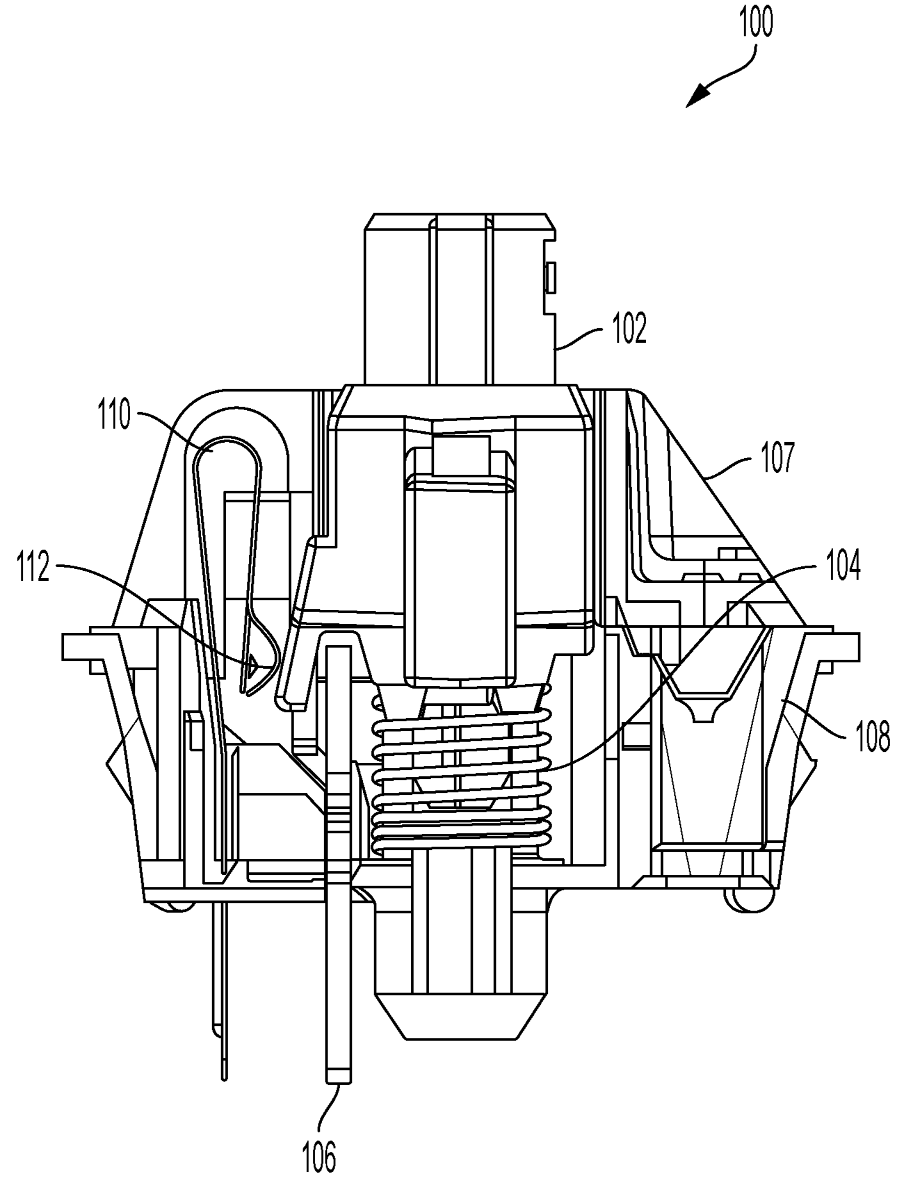
FIG. 1 PRIOR ART
FIG. 1 is a side elevation cutaway view of a prior art mechanical keyboard switch.
Figure 2:
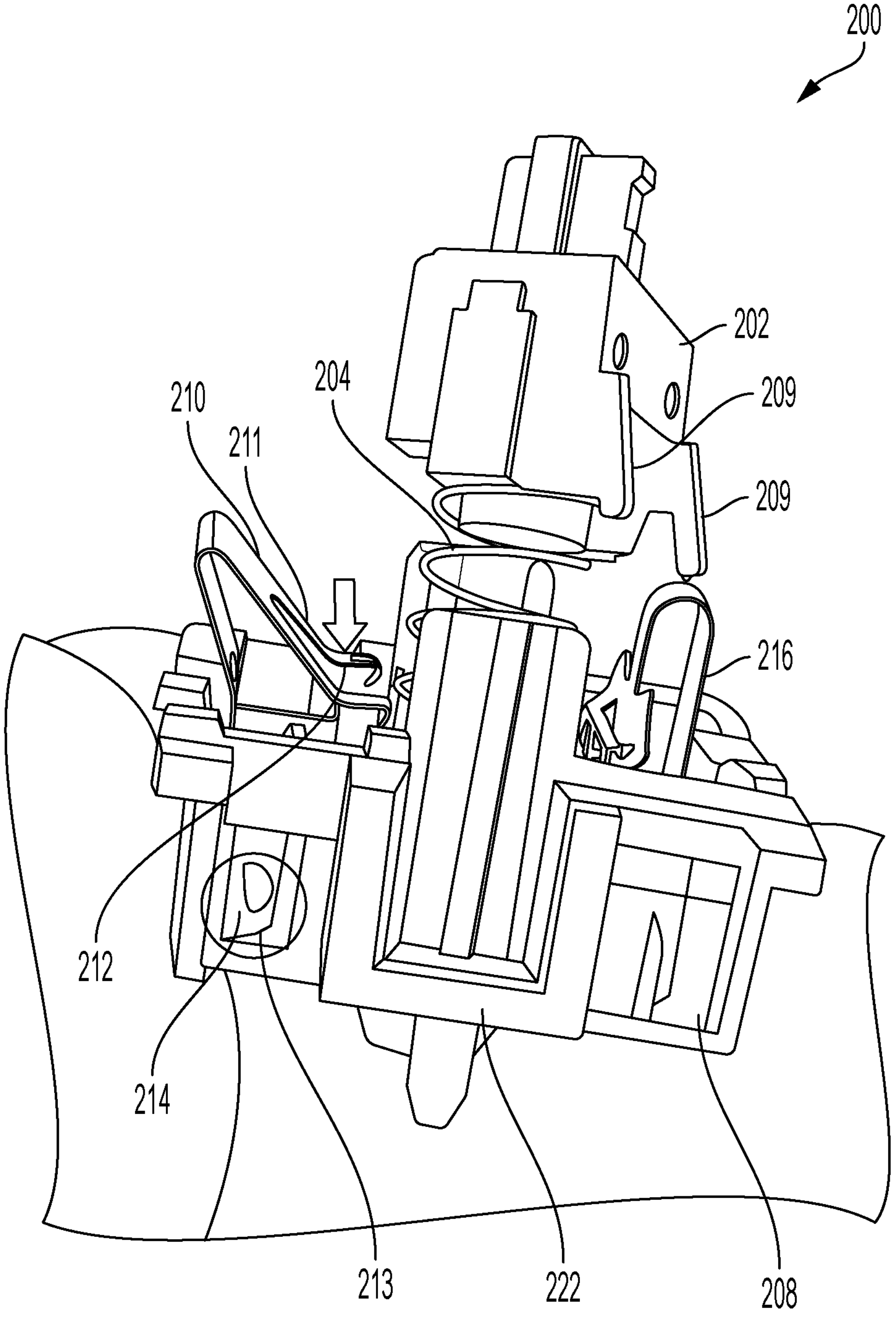
FIG. 2 shows a mechanical keyboard switch assembly according to one embodiment, wherein the switch is in clicky mode.
Figure 3:
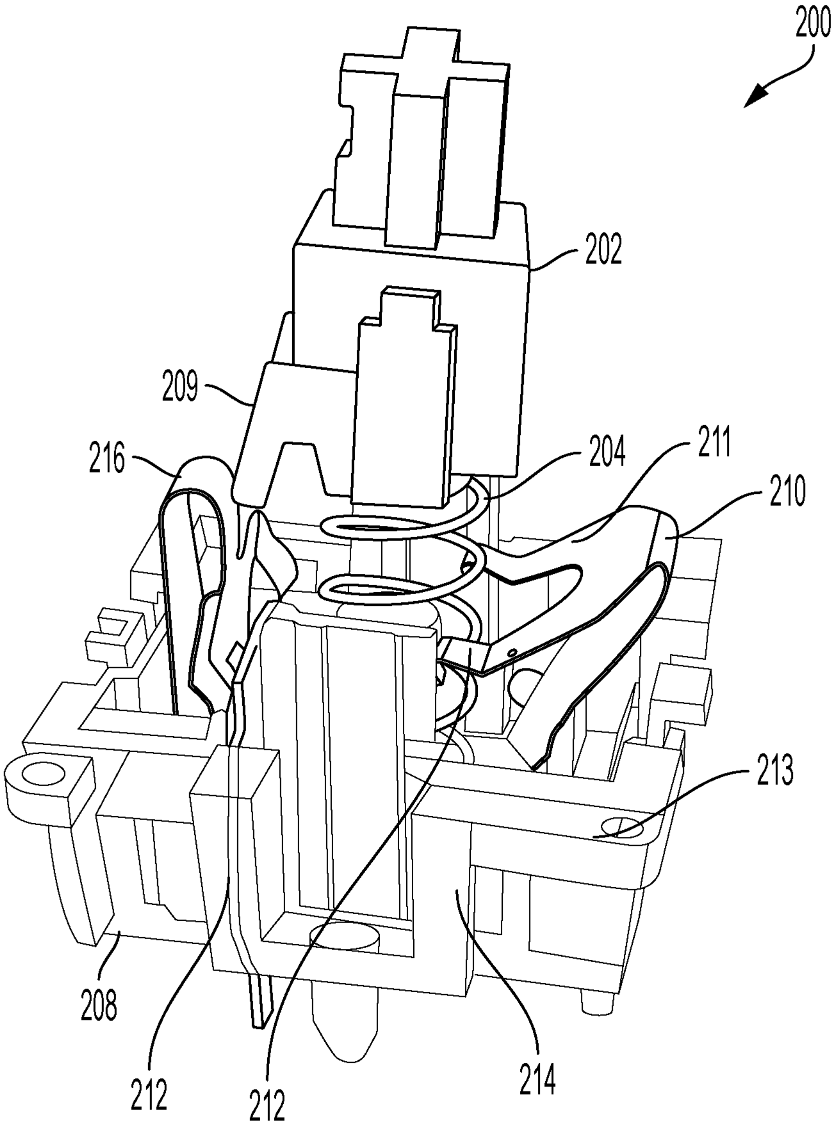
FIG. 3 shows the mechanical keyboard switch assembly of FIG. 2, wherein the switch is in tactile mode.

FIGS. 2 and 3 illustrate a mechanical key switch assembly 200 according to one embodiment, shown configured in different modes. Switch assembly 200 has a stem 202, supported by a coil spring 204. For ease of illustration of the modes, not shown in the figures are the key cap supported by the stem 202 and the upper housing that supports the stem 202 and key cap.

Switch assembly 200 may include a contact leaf spring 210. A portion of contact leaf spring 210 is in the travel path of stem 202 and depending on its position it provides auditory (clicky) and/or tactile feedback through its interaction with stem 202 as stem 202 moves down during a keystroke. The various modes (clicky, tactile and linear) are produced by shifting the position of the contact leaf spring 210 or by removing the contact leaf spring 210. FIG. 2 shows the switch assembly 200 arranged in clicky mode by the contact leaf spring 210 being placed in a first position. FIG. 3 shows the switch assembly 200 arranged in tactile mode by the contact leaf spring 210 being placed in a second position. If the contact leaf spring 210 is removed from or absent from switch assembly 200, the switch assembly 200 is in linear mode.

Figure 4:
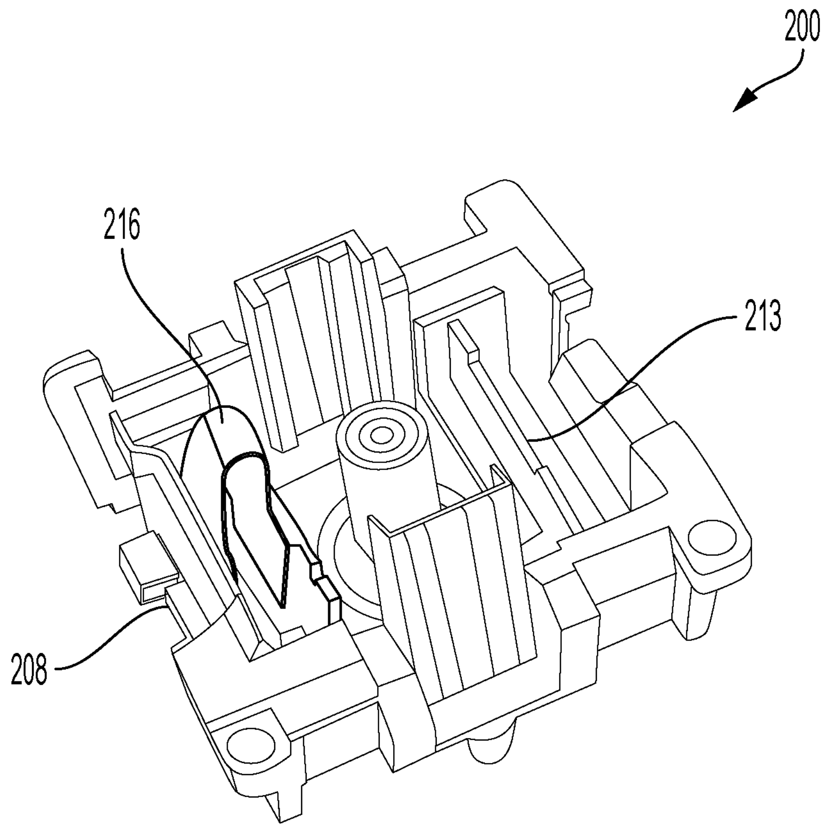
FIG. 4 is a top perspective view of a portion of the mechanical keyboard switch assembly of FIG. 2, wherein the contact leaf spring has been removed.
Figure 5:
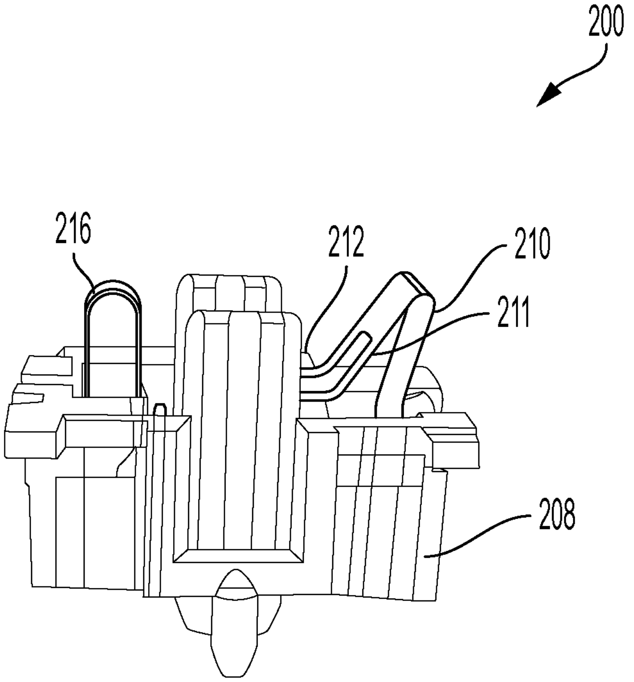
FIG. 5 shows a mechanical keyboard switch assembly according to one embodiment in clicky mode with the stem removed.
Figure 7:
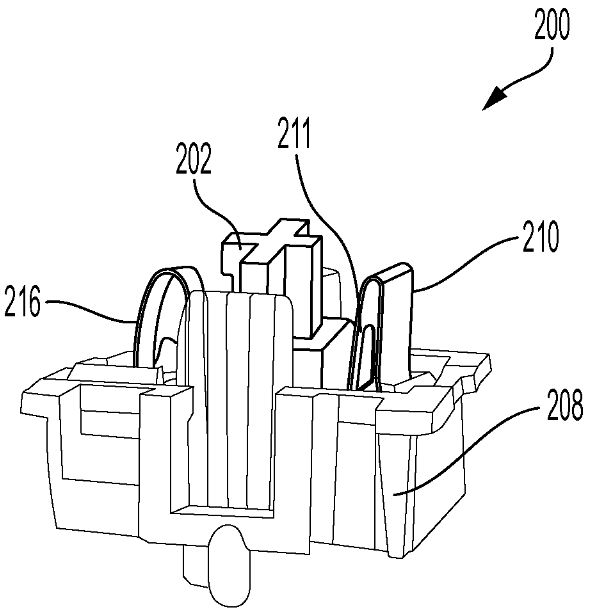
FIG. 7 shows a mechanical keyboard switch assembly according to one embodiment in clicky mode with the stem in its depressed position.

Contact leaf spring 210 includes a pair contact prongs 211, each prong having a curved tip 212 that is positioned in the travel path of the rear portion of stem 202 as it is moved downward during a keystroke. Depending on the orientation of the contact leaf spring 210 and interactions between the stem 202 and the contact leaf spring 210, and between the contact leaf spring 210 and the housing, the impingement of the contact leaf spring may produce an audible click (referred to as clicky mode of operation) or a quieter or not audible click. In the first position as seen in FIG. 2, the contact leaf spring 210 is located such that in normal operation of the key cap being depressed, the stem 202 displaces the contact leaf spring 210 (which causes potential energy to build in the contact leaf spring 210) and, as the stem 202 moves down past the contact leaf spring 210, allows the contact leaf spring 210 to release its potential energy by springing back, striking the switch housing with sufficient impact force to produce an audible clicking sound for clicky mode of operation. In this first position, the lower end or leg 214 of contact leaf spring 210 is seated behind a ledge 213 of base 208 of switch assembly 200 (i.e. the base of leg 214 is seated closer to the outer wall of the switch assembly than the interior of the switch assembly). This first position also results in a noticeable "bump" (tactile feedback) as the stem is pushed down past the curved tip 212 of the contact leaf spring 210. The ledge 213 extending from the base 208 is seen more clearly in FIG. 4 which shows the switch assembly 200 with the contact leaf spring 210 removed. FIGS. 5 and 7 also illustrate a contact leaf spring 210 seated in this first position, with the lower end of contact leaf spring 210 placed behind ledge 213 of base 208.

Figure 6:
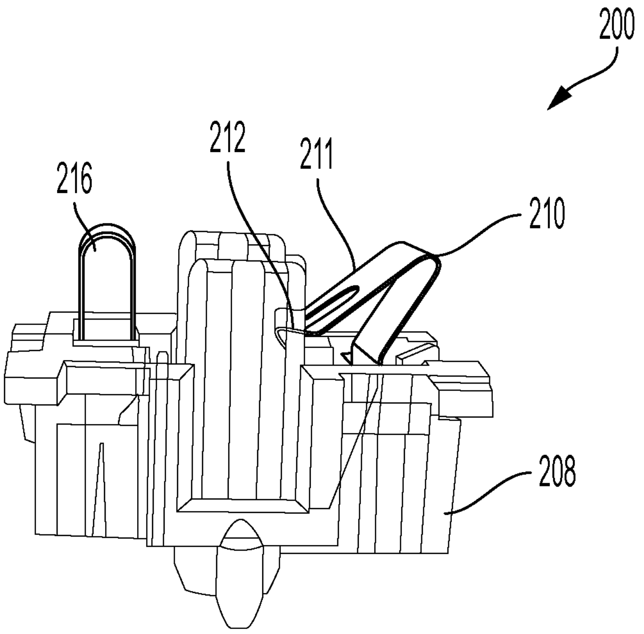
FIG. 6 shows the mechanical keyboard switch assembly of FIG. 5 in tactile mode with the stem removed.
Figure 8:
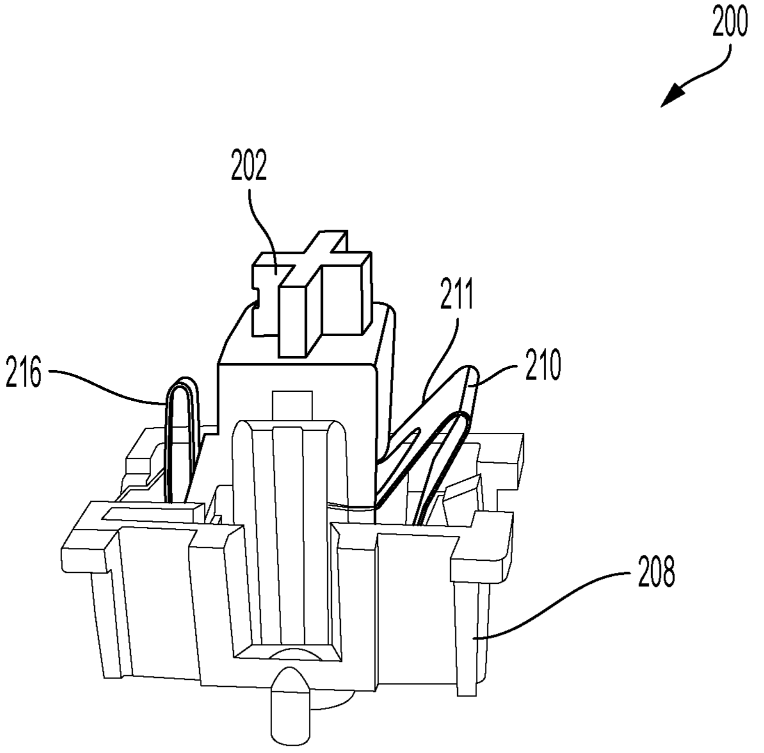
FIG. 8 shows the mechanical keyboard switch assembly of FIG. 7 in tactile mode with the stem in its resting state.

In its second position, as seen in FIGS. 3, 6 and 8, the contact leaf spring 210 is positioned to have its leg 214 seated in front of ledge 213 and closer to the interior of the switch assembly 200 than in the first position of FIG. 2. This changes the angle of the contact leaf spring 210 and raises the contact prongs 211 of contact leaf spring 210 so that they are positioned relatively higher than their position in FIG. 2. The leg 214 may be positioned a few millimetres forward of ledge 213, so that the distance that the leaf spring 210 is able to move and its angle is changed. This change in position decreases the distance between contact leaf spring 210 and stem 202 in its initial state, and reduces the impact force between stem 202 and contact leaf spring 210 as the key cap is being pushed down by the user. In this orientation the displacement of the contact leaf spring 210 as the stem 202 travels down is reduced (as compared with the contact leaf spring 210 being in the first position), such that when the contact leaf spring 210 is released, it does not strike the switch housing with as much force. The second position thereby eliminates an audible click sound, or results in a quieter click sound over the response provided in the first position, as the key cap is being pushed down. This causes the switch to produce tactile feedback (as described in more detail below), with no or reduced clicking sound upon the downward stroke. However, in some embodiments, in this second position a click sound is made through the contact between the stem 202 and the contact leaf spring 210 as the stem 202 travels back up after the user ceases pressing down on the key cap.

In the second position seen in FIGS. 3, 6 and 8, tactile feedback is provided to the user through the sliding of stem 202 past the bump on curved tip 212 of each prong 211 of contact leaf spring 210. Since the curved tip 212 is positioned at an angle to stem 202 (rather than in the more vertical position shown in FIG. 2), the resistance provided by contact leaf spring 210 to the movement of stem 202 is increased and results in a more noticeable tactile "bump" response as the user pushes on the key cap and moves the stem 202 down. The second position of the contact leaf spring 210 in FIG. 3 produces a tactile mode of operation for the key switch assembly 200, since the tactile response is more pronounced, and the click sound upon the downward stroke is eliminated or is reduced significantly over the first position seen in FIGS. 2, 5, and 7.

When the contact leaf spring 210 is moved to the second position, the top of the contact leaf spring 210 is pushed further out, distally away from the stem and closer to the walls of the switch housing. As such, for multi-mode operation of the switch, the top of the switch housing (which is not shown in FIGS. 2-9, but would fit on top of the base of the switch housing to enclose the components of the switch), needs to be shaped to have sufficient interior space to accommodate the upper portion of contact leaf spring 210 either in the first position (for clicky mode) or second position (for tactile mode).

If the user does not want either clicky or tactile feedback, the user removes contact leaf spring 210 from the mechanical key switch assembly 200. Since there is nothing to impinge on stem 202 until it bottoms out and reaches the base 208 of the switch assembly 200, stem 202 will simply travel the maximum distance in a key stroke without producing any significant auditory or tactile feedback (as would otherwise be provided through impact with the contact leaf spring). In this mode of operation, the mechanical key switch assembly 200 provides linear feedback (i.e. the user feels the key switch moving down as the key cap is depressed). In each of the clicky, tactile and linear modes of operation, at the end of the downward part of the keystroke the stem bottoms out and impinges on the base of the housing. This bottoming out may produce some audible feedback but it is generally less significant than the feedback provided by the contact leaf spring striking the housing during clicky mode of operation.

Whether the keyboard switch assembly is being operated in clicky, tactile or linear modes, actuation of the switch is provided through a conductive leaf spring 216 (e.g. copper leaf spring) that is positioned to one side of the stem 202. As the stem 202 moves down in a key stroke, a pair of leg extensions 209 on the lower portion of stem 202 push against the leaf spring 216 and cause the leaf spring 216 to make contact with another conductive element positioned in the base 208, thereby closing the switch circuit.

In certain embodiments, the switch assembly 200 is compatible with aftermarket keyboards, keycaps and PCBs, while introducing a new clicky, tactile or linear feedback to the switch, depending on which mode it is set to. For example, switch assembly 200 may have the same pinout form factor, switch outer dimensions to the fit plates, and same cross-shaped stem for key cap compatibility with Cherry MX keyboards.

In particular embodiments, the switch top needs to be removed by the user to provide access to the switch's interiors so as to be able to reposition or remove the leaf spring to change between the different feedback modes, In other embodiments, a slider is provided to help reposition the leaf spring so that the switch does not have to be opened by the user to do so. In still other embodiments, a two or four-faced stem is provided wherein the user can change the feedback of the switch by either pressing the switch down in a certain manner, or opening up the switch top and rotating the stem 90° or 180°.

In alternate embodiments, instead of relying on a leaf spring to provide an audible click or tactile feedback, the centre stem 202 can be made to have different bump or angular profiles to recreate various tactile responses.

In a particular embodiment, the components of switch assembly 200 provide improved stability, click response, tactility and overall durability. Components which provide these advantages are described in further detail below, with reference to FIG. 4.

Figure 9:
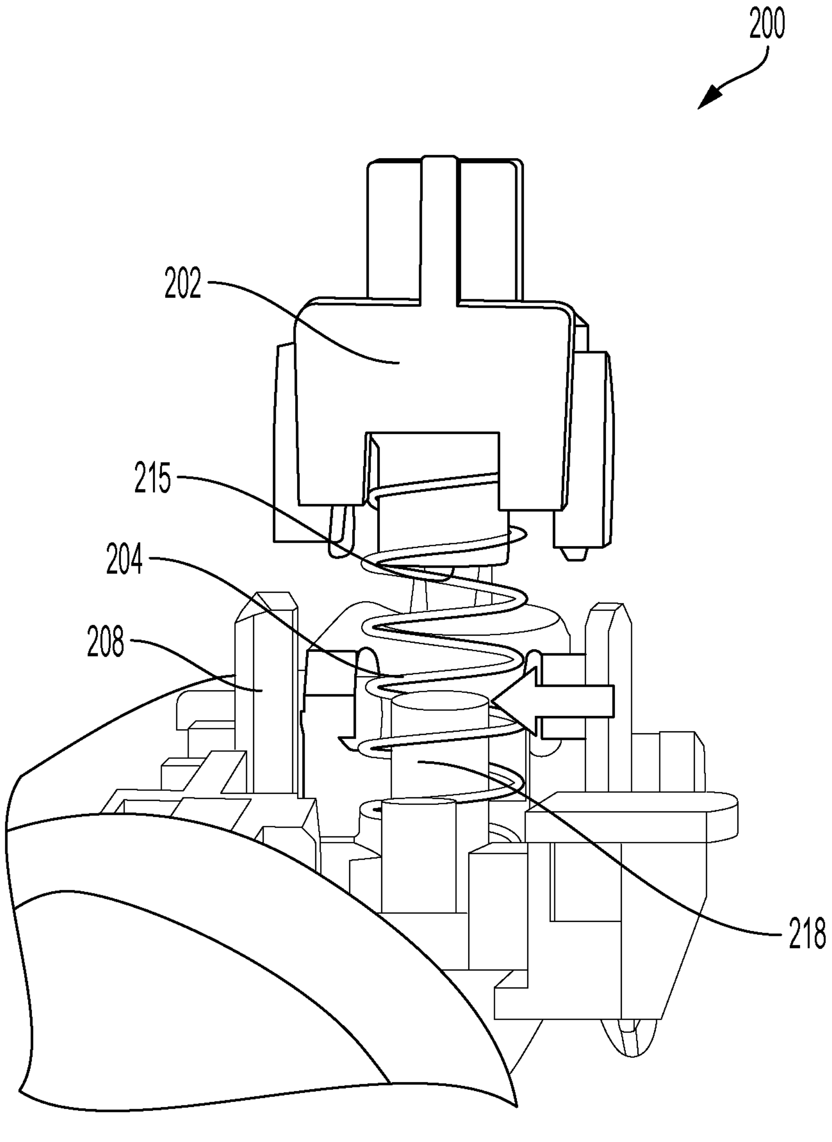
FIG. 9 shows a stem and spring coil mounted to a base for a mechanical keyboard switch assembly according to one embodiment.

As seen in FIG. 9, the switch stem 202 retains a cross shape to maintain keycap compatibility with certain existing MX switches. However, instead of providing a pole in the stem that inserts into a cavity defined in the base as seen in traditional MX switches, the bottom of the stem 202 of the FIG. 4 switch assembly 200 has a cavity 215 defined therein that receives a pole 218 extending from the base 208 of the switch. Providing the cavity 215 in the bottom of the stem 202 creates a more stable switch with less wobble, and prevents issues such as lubricant settling into and getting stuck into a hole of the base, which can causes unpleasant "plop" sounds when modifying the switches or adding lubricant. Further, some Alps switches are quite wobbly due to their rectangular stem design with looser tolerances, which can mean that dust or dirt gets into the switches, affecting the feel over the years. As such, in the FIG. 9 embodiment, the diameter of the pole 218 in the base 208 is widened to increase stability with tighter tolerances.

The examples and corresponding diagrams used herein are for illustrative purposes only. Different configurations and terminology can be used without departing from the principles expressed herein.

Although the invention has been described with reference to certain specific embodiments, various modifications thereof will be apparent to those skilled in the art without departing from the scope of the invention. The scope of the claims should not be limited by the illustrative embodiments set forth in the examples, but should be given the broadest interpretation consistent with the description as a whole.

The invention claimed is:

1. A mechanical key switch assembly comprising:

a housing;

a stem supported in a base of the housing, the stem constrained to move, when depressed during a keystroke, from a resting state and toward the base of the housing;

a removable contact leaf spring seated in the housing, the contact leaf spring having a contact portion located in a travel path of the stem for engaging with the stem during the keystroke to provide audible and/or tactile feedback;

wherein the contact leaf spring is movable between a first seated position and a second seated position in the housing, wherein a distance between the contact portion and the stem at the resting state is decreased by moving the contact leaf spring from the first seated position to the second seated position in the housing, wherein the decreased distance is associated with decreased audible feedback.

2. The switch assembly of claim 1 wherein the contact portion of the contact leaf spring comprises one or more flexible prongs extending toward the stem and produces tactile feedback as the contact portion engages with the stem during the keystroke; and wherein an angle between the contact portion and the stem at the resting state is increased by moving the contact leaf spring from the first seated position to the second seated position in the housing, wherein the increased angle is associated with increased tactile feedback.

3. The switch assembly of claim 1 or 2 wherein the housing comprises a plurality of outer walls surrounding the stem, and a base supporting a ledge spaced apart from one of the outer walls, wherein in the first seated position the contact leaf spring is seated between the ledge and the one of the outer walls, proximally to the one of the outer walls, and is oriented substantially vertically, and wherein in the second seated position the contact leaf spring is seated between the ledge and the stem, proximally to the stem, and is oriented at an angle with respect to the stem so as to provide increased resistance to movement of the stem during an initial part of the keystroke.

4. The switch assembly of any one of claims 1 to 3 wherein removal of the contact leaf spring from the housing enables the stem to travel its maximum keystroke distance without auditory or tactile feedback.

5. The switch assembly of any one of claims 1 to 4 comprising a switch contact positioned adjacent to the stem, wherein the switch contact comprises a conductive leaf spring having one or more legs extending toward the stem, wherein during the keystroke the one or more legs are pushed by the stem so as to make contact with a conductive element in the base, thereby closing a switch circuit.

6. A mechanical keyboard switch assembly comprising:

a housing;

a stem supported in the housing, the stem constrained to move, during a downward part of a keystroke, from a resting position and toward a base of the housing; and a contact leaf spring supported in the housing, wherein the contact leaf spring has a leaf contact portion arranged to be impinged by a stem contact portion of the stem during the downward part of the keystroke to provide tactile and/or audible feedback, and the contact leaf spring is adjustable between a first orientation and a second orientation, wherein adjusting the contact leaf spring from the first orientation to the second orientation changes the tactile and/or audible feedback.

7. The mechanical keyboard switch assembly of claim 6, wherein in the first orientation the leaf contact portion is a first distance from the stem contact portion when the stem is in the resting position, and in the second orientation the leaf contact portion is a second distance from the stem contact portion when the stem is in the resting position, wherein the first distance is greater than the second distance.

8. The mechanical keyboard switch assembly of claim 6 or 7, wherein the leaf contact portion is displaced by the stem contact portion during the downward part of the keystroke, wherein when the contact leaf spring is in the second orientation an increased level of force is required to be exerted on the stem to displace the leaf contact portion than when the contact leaf spring is in the first orientation.

9. The mechanical keyboard switch assembly of any one of claims 6 to 8, wherein the leaf contact portion is oriented at a first angle with respect to the stem when the contact leaf spring is in the first orientation and the stem is in the resting position, and the leaf contact spring is oriented at a second angle with respect to the stem when the contact leaf spring is in the second orientation and the stem is in the resting position, wherein the second angle is greater than the first angle.

10. The mechanical keyboard switch assembly of any one of claims 6 to 9, wherein the leaf contact portion has one or more flexible prongs located to be impinged by the stem contact portion during the downward part of the keystroke.

11. The mechanical keyboard switch assembly of any one of claims 6 to 10 wherein the contact leaf spring is removable from the housing.

12. The mechanical keyboard switch assembly of any one of claims 6 to 11 comprising a pole extending from the base of the housing, and wherein the stem has a cavity defined therein for receiving the pole.

13. The mechanical keyboard switch assembly of any one of claims 6 to 12 wherein the housing comprises a plurality of walls extending from the base of the housing, wherein the base comprises a ledge spaced apart from one of the outer walls, wherein in the first orientation the contact leaf spring is seated between the ledge and the one of the outer walls, proximally to the one of the outer walls, and is oriented substantially vertically, and wherein in the second orientation the contact leaf spring is seated between the ledge and the stem, proximally to the stem, and is oriented at an angle with respect to the stem so as to provide increased resistance to movement of the stem during the downward part of the keystroke.

14. A method for manufacturing a mechanical key switch assembly comprising:

providing a housing;

providing a stem supported in a base of the housing, the stem constrained to move, when depressed during a keystroke, from a resting state and toward the base of the housing; and providing a removable contact leaf spring having a contact portion, wherein when the contact leaf spring is seated in the housing the contact portion is located in a travel path of the stem for engaging with the stem during the keystroke to provide audible and/or tactile feedback;

wherein the contact leaf spring is movable between a first seated position and a second seated position in the housing, wherein a distance between the contact portion and the stem at the resting state is decreased by moving the contact leaf spring from the first seated position to the second seated position in the housing, wherein the decreased distance is associated with decreased audible feedback.

15. The method of claim 14 wherein the contact portion of the contact leaf spring comprises one or more flexible prongs extending toward the stem and providing tactile feedback as the contact portion engages with the stem during the keystroke; and wherein an angle between the contact portion and the stem at the resting state is increased by moving the contact leaf spring from the first seated position to the second seated position in the housing, wherein the increased angle is associated with increased tactile feedback.

16. The method of claim 14 or 15 wherein the housing comprises a plurality of outer walls surrounding the stem, and a base supporting a ledge spaced apart from one of the outer walls, wherein in the first seated position the contact leaf spring is seated between the ledge and the one of the outer walls, proximally to the one of the outer walls, and is oriented substantially vertically, and wherein in the second seated position the contact leaf spring is seated between the ledge and the stem, proximally to the stem, and is oriented at an angle with respect to the stem so as to provide increased resistance to movement of the stem during an initial part of the keystroke.

17. The method of any one of claims 14 to 16 wherein removal of the contact leaf spring from the housing enables the stem to travel its maximum keystroke distance without auditory or tactile feedback.

18. The method of any one of claims 14 to 17 comprising positioning a switch contact adjacent to the stem, wherein the switch contact comprises a conductive leaf spring having one or more legs extending toward the stem, wherein during the keystroke the one or more legs are pushed by the stem so as to make contact with a conductive element in the base, thereby closing a switch circuit.

* * * * *